United States Patent [19]

Hayakawa

[11] Patent Number: 5,436,753
[45] Date of Patent: Jul. 25, 1995

[54] VIBRATING MIRROR

[75] Inventor: Hiroshi Hayakawa, Urawa, Japan

[73] Assignee: Opticon, Inc., Orangeburg, N.Y.

[21] Appl. No.: 889,603

[22] Filed: May 27, 1992

[51] Int. Cl.$^6$ .................... G02B 26/08; G02B 26/10
[52] U.S. Cl. .................... 359/213; 359/199; 359/221; 359/224
[58] Field of Search ............. 359/213, 214, 220, 221, 359/224, 225, 226, 230, 198, 199, 222; 235/435, 462

[56] References Cited

U.S. PATENT DOCUMENTS

| | | | |
|---|---|---|---|
| 1,980,888 | 11/1934 | Thomas | 359/224 |
| 2,920,529 | 1/1960 | Blythe | 359/224 |
| 3,959,673 | 5/1976 | Montagu | 359/214 |
| 3,999,833 | 12/1976 | Reich et al. | 359/214 |
| 4,129,930 | 12/1978 | Dragt | 359/221 |
| 4,302,720 | 11/1981 | Brill | 359/213 |
| 4,389,101 | 6/1983 | van Rosmalen | 359/225 |
| 4,632,501 | 12/1986 | Glynn | 359/213 |
| 4,958,894 | 9/1990 | Knowles | 359/213 |
| 5,212,582 | 5/1993 | Nelson | 359/224 |
| 5,253,098 | 10/1993 | Hikita et al. | 359/224 |

Primary Examiner—Georgia Y. Epps
Assistant Examiner—Michael A. Papalas
Attorney, Agent, or Firm—Henry Shanzer

[57] ABSTRACT

Systems embodying the invention include an arm having a polished mirror-like surface located on the arm. The arm includes means for mounting the arm on a shaft (or spindle) to allow the arm to rotate freely in the lateral direction (perpendicular to the length of arm). The arm is intended for use in a system which includes means for directing a beam of light onto the mirror-like surface whereby when the mirror-like surface is rotated (e.g., by Beta degrees) the beam of light reflected from the mirror-like surface is swept through a proportionate number of (e.g., 2 Beta) degrees. An electrically controllable system is coupled to the arm causing the arm to move in one direction and then in the opposite direction whereby the arm is caused to vibrate (oscillate) back and forth. In a preferred embodiment the mirror is located at one end of the arm while the other end of the arm is part of an electrically controllable magnetic system which includes a coil and means for selectively passing a current in a first sense through the coil to cause the arm to move in one direction and then for passing a current in the opposite sense through the coil to cause the arm to move in the opposite direction whereby the arm is caused to vibrate (oscillate) back and forth.

21 Claims, 12 Drawing Sheets

VIBRATING MIRROR

BACKGROUND OF THE INVENTION

This invention relates to means for causing a member, such as an arm, to oscillate back and forth (vibrate) and, in particular, to means for causing the member to vibrate with very little power consumption.

In certain applications, such as a bar code reader, it is necessary to scan, or sweep, a light beam across a target, such as a bar code, and to receive the light reflected from the bar code to subsequently decode the information encoded in the bar code. FIG I illustrates the format a bar code may have (parallel bars of different widths and spacing) and a laser light beam sweeping across the bar code (i.e. the target). A known method for sweeping a light beam across a bar code includes a stepper motor used to turn a mirror arrangement as shown in FIG. 2. A light source (laser or LED) is beamed onto the surface of the mirror. The mirror is rotated beta degrees by the stepper motor which causes the light beam to sweep through an angle of two beta degrees across a target (e.g. a bar code).

Another method for sweeping a light beam across a target includes the use of a miniature motor attached to a polygon mirror whose rotation is controlled by the motor, as shown in FIG. 3. Each surface or face of the "rotating" polygon is highly polished and functions as a mirror causing a light beam incident on the surface of the polygon to sweep across the target.

A significant problem with the prior art design is the power consumed by these systems. For example, the stepper motor of FIG. 2 requires 50 milliamperes at a voltage of 12 volts, which is equal to 600 milliwatts and the motor to drive the mirror of FIG. 3 requires 24 milliamps at a voltage of 12 volts, which is equal to 288 milliwatts. Thus, an object of the invention is to overcome the power consumption problem present in the prior art. This is particularly so in applications which are intended to be battery operated, It is also an object of the invention to have a scanning system for use in applications, such as bar code readers (or scanners), where it is required that the system be portable, be of light weight, and be highly compact and have very few moving parts.

SUMMARY OF THE INVENTION

Systems embodying the invention include an arm of length "L", having a polished mirror-like surface located on the arm. The arm includes means for mounting the arm on a shaft (or spindle) to allow the arm to rotate freely in the lateral direction (perpendicular to the length of arm). The arm is intended for use in a system which includes means for directing a beam of light onto the mirror-like surface whereby when the mirror-like surface is rotated (e.g., by Beta degrees) the beam of light reflected from the mirror-like surface is swept through a proportionate number of (e.g., 2 Beta) degrees. An electrically controllable system is coupled to the arm causing the arm to move in one direction and then in the opposite direction whereby the arm is caused to vibrate (oscillate) back and forth.

In a preferred embodiment, the mirror-like surface is located at one end of the arm while the other end of the arm is part of an electrically controllable magnetic system which includes a coil and means for selectively passing a current in a first sense through the coil to cause the arm to move in one direction and then for passing a current in the opposite sense through the coil to cause the arm to move in the opposite direction whereby the arm is caused to vibrate (oscillate) back and forth.

In systems embodying the invention, the electrically controllable magnetic system may include a toroidally wound coil attached to the other end of the arm and a U-shaped permanent magnet fixedly positioned with one leg of the U of the magnet being located within the center of the toroidally wound coil. The permanent magnet provides a uniform magnetic field which includes the coil. The system includes means for passing bi-directional current through the coil, whereby the magnetic field direction encompassing the coil can be altered inducing solenoid like action which causes the arm to vibrate back and forth.

BRIEF DESCRIPTION OF THE DRAWING

In the accompanying diagrams like reference characteristics denote like components.

DETAILED DESCRIPTION OF THE INVENTION

Figure 1:
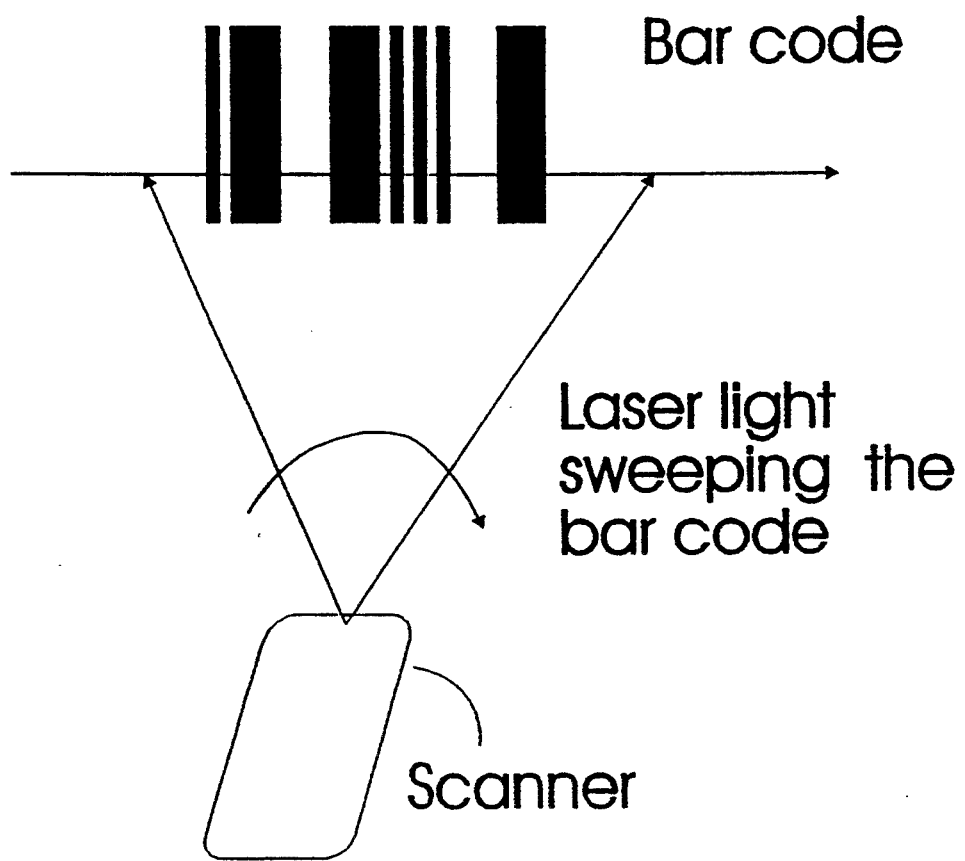
FIG. 1 illustrates the use of a laser light to sweep a bar code.
Figure 2:
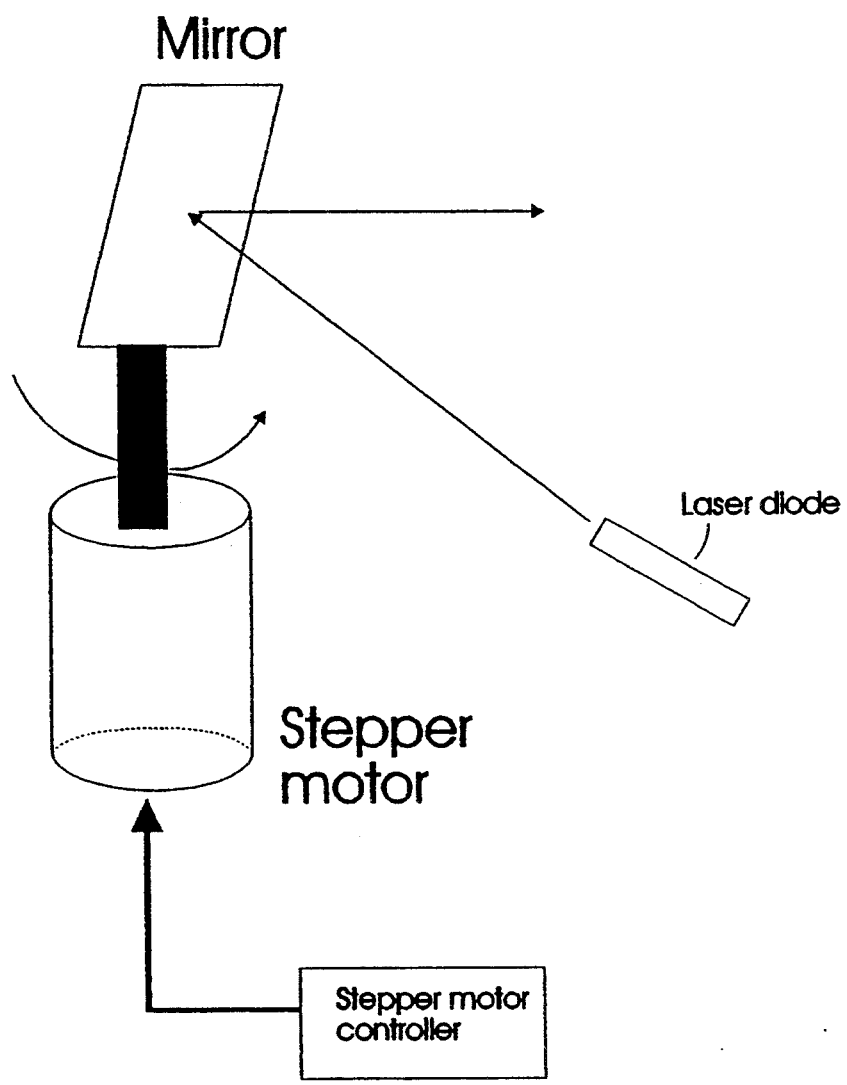
FIG. 2 is a representation of a prior art stepper motor arrangement for rotating a mirror.
Figure 3:
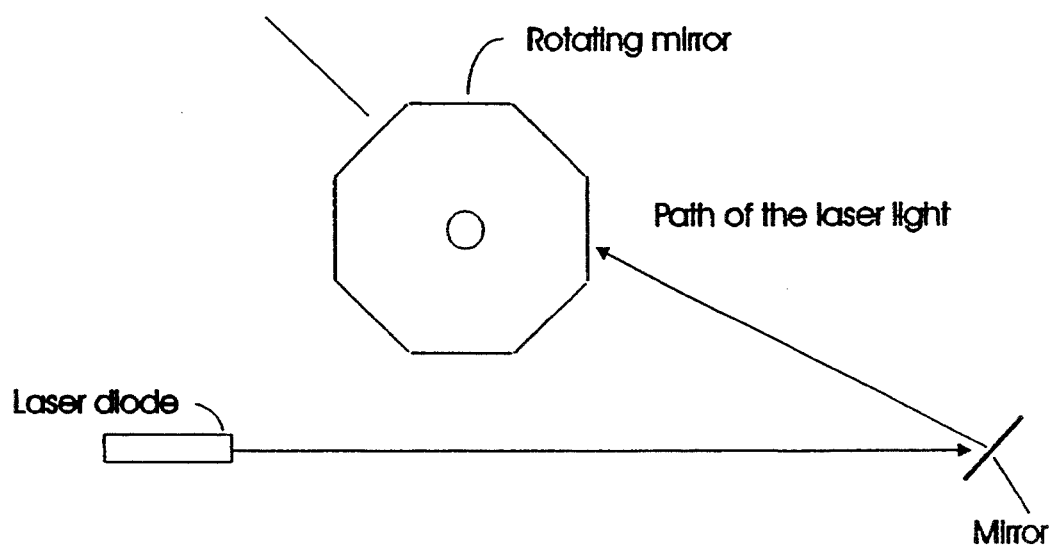
FIG. 3 is a representation of a prior art arrangement using a motor to cause the rotation of a polygon mirror.
Figure 4:
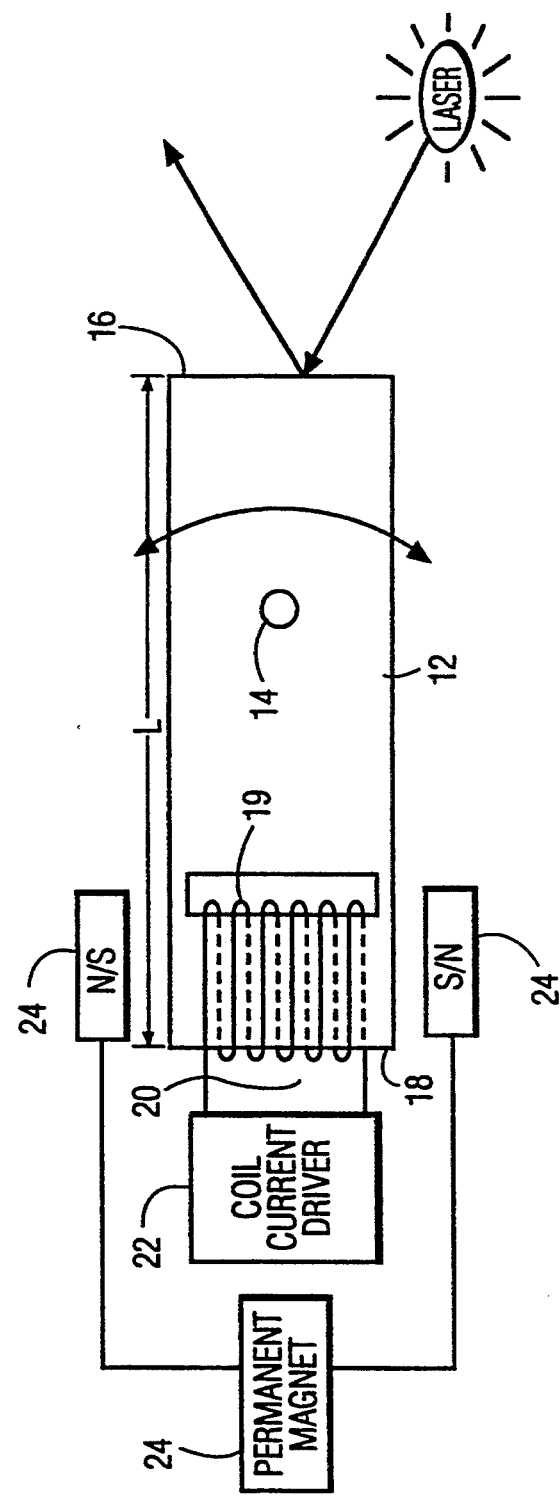
FIG. 4 is an idealized representation of an electromagnet arrangement embodying the invention.

The invention may best be explained with reference to FIG. 4 which shows a conceptual symbolic representation of part of a system embodying the invention. The apparatus of FIG. 4 shows an arm 12 with a mounting hole 14 for mounting the arm on a shaft (or spindle) to enable the arm to rotate back and forth laterally (as shown by the two headed curved arrow) with little friction. One end, 16, of the arm 12 is highly polished and functions as a mirror to reflect light incident on the surface. Located at the other end 18 of the arm 12 is a coil 20. For ease of illustration the coil is shown wound between the end 18 of the arm and a slot 19 in the arm. However, it should be appreciated that many different physical embodiments are possible. The current through the coil 20 is controlled by a coil current driver 22 which is coupled to it and supplies bi-directional current to the coil; i.e. a current which flows in either a first sense (direction) or in the opposite sense (direction). The bi-directional current flowing through the coil 20 causes the magnetic field radiating from the coil to be of one polarity for one direction of current and of opposite polarity for the other opposite direction of current. The coil 20 on arm 12 is mounted in close proximity to a permanent magnet 24 which is fixedly mounted. The permanent magnet 24 produces a magnetic field direction encompassing the coil 20, whereby solenoid like action is obtained when the current direction through the coil is changed. That is, the magnetic field induced in the coil interacts with the magnetic field produced by the permanent magnet 24. In essence, a current flowing in one direction through the coil produces a first magnetic field of one sense perpendicular to the permanent magnetic field. A current flowing in the opposite direction through the coil produces a second magnetic field perpendicular to the permanent magnetic field and opposite to the sense of the first field; i.e., the magnetic field is reversed. Thus, current reversals through the coil induce reversals of the magnetic field coupling the coil and the permanent magnet causing the arm to vibrate back and forth.

Figure 5:
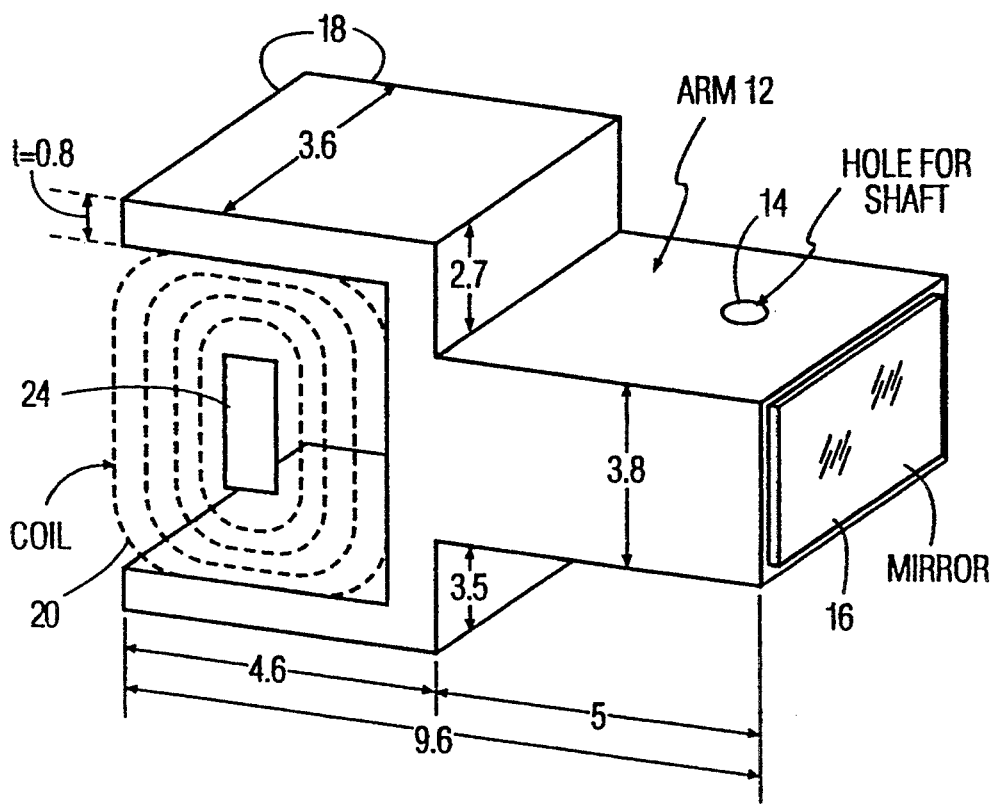
FIG. 5 is an isometric representation of an electromagnet arrangement embodying the invention.

In a preferred embodiment the arm 12 is formed as shown in FIG. 5. The effective length of the arm is 9.6 millimeters (mm) and the width of the arm is 3.6 mm. The surface area of the reflecting surface located at end 16 of arm 12 is approximately 13.68 square mm (3.6 mm×3.8 mm) and lies in a plane which is generally perpendicular to the length of the arm 12. The other end 18 of arm 12 is an inverted C-shaped like pocket with the open end of the C facing away from the arm. The inverted C-shape of the arm enables the positioning and the containing of a coil within its bounds. In this particular embodiment the external dimensions of the C-shaped pocket are approximately 10 mm×4.6 mm×3.6 mm. The coil, as noted above, is mounted within the C-shaped pocket and is mechanically attached or chemically bonded to the wall of the pocket. In one embodiment, the coil consists of 270 turns of very thin wire (e.g., 0.1 mm diameter) which are wound like a toroid or rectangle to permit one leg of magnet 24 to be located within the center of the toroid or rectangle, as shown in FIG. 5. In one form the total weight of the arm with the coil was 0.36 grams.

Figure 6:
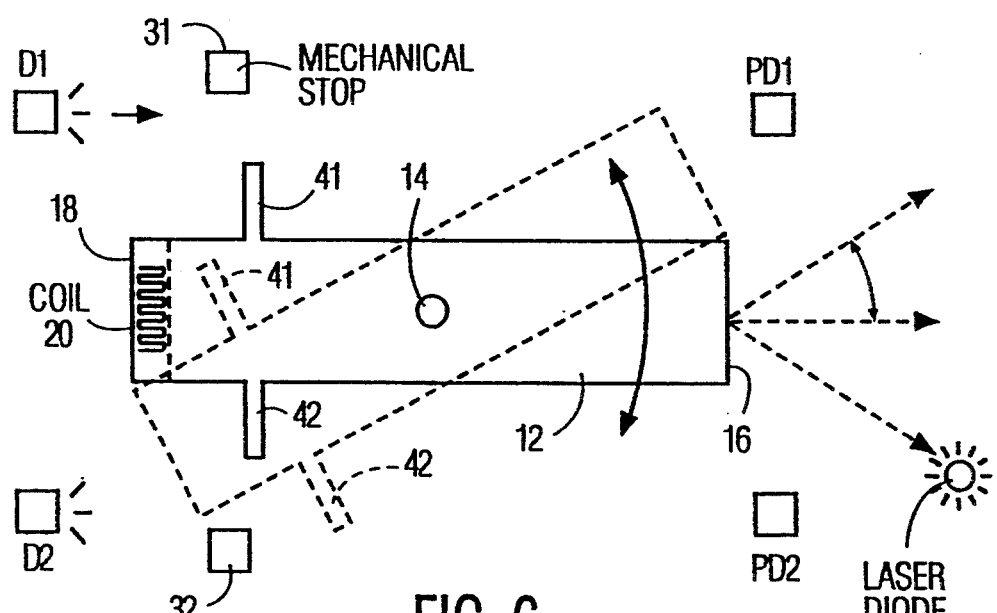
FIG. 6 is an idealized representation of the mechanical part of a system embodying the invention.

In practice, arm 12 may include shuttering means 41,42, as shown in FIG. 6. Also, as shown in FIG. 6, the system includes mechanical stop means 31,32 to limit the length of travel of the arm. The coil 20 and magnet 24 are not detailed in FIG. 6 to simplify the description. Referring to FIG. 6 there is shown (symbolically) two mechanical stops 31 and 32 which function to end the travel of the arm in the lateral direction. In systems embodying the invention the arm and the mechanical stops are designed such that when the arm strikes either mechanical stop it is caused to bounce back in the opposite direction. That is, the kinetic energy associated with the moving arm as it strikes a stop is transferred from the stop to the arm to begin motion in the opposite direction. This contributes to the reduction of the power consumption of the system. This feature will be further detailed below.

FIG. 6 also shows two light emitting diodes (LEDs) D1 and D2 positioned near end 18 of the arm 12 and two photo transistors or photo diodes (PD1,PD2) physically positioned opposite D1 and D2 near the other end 16 of the arm. D1 provides a light signal for PD1 and D2 provides a light signal for PD2. Attached to the arm 12 are two extensions 41,42 which function as shutters. In systems embodying the invention, either the shutters 41,42 or the arm 12 itself may be used to block the light from D1 and D2 incident on PD1,PD2.

As detailed below, when the end 18 of arm 12 or one of the shutters (41,42) blocks the light incident on a photo diode (PD1,PD2) a signal is generated which causes the current in the coil 20 to be reversed.

Figure 8:
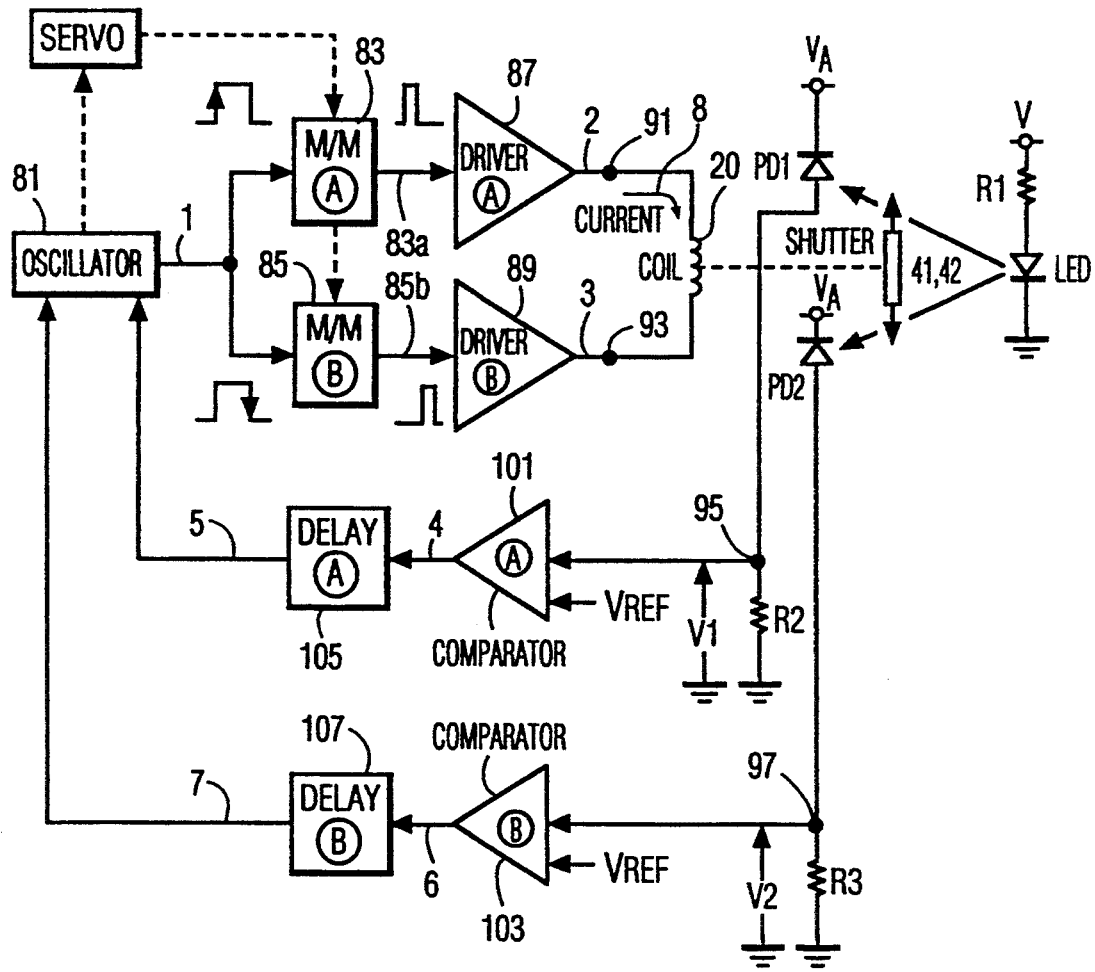
FIG. 8 is a block diagram of circuitry to drive a coil in accordance with the invention.

This in turn causes a reversal of the magnetic vector linking the coil/arm of the combination and the permanent magnet 24 which in turn causes the arm to be propelled in the opposite direction. By way of example, assume the arm 12 to be traveling in a direction such that end 18 of arm 12 is moving towards mechanical stop 31, as the end 18 of arm 12 (or shutter 41) interrupts the light beam between D1 and PD1, current sensing circuitry connected to PD1 (as shown in FIG. 8) senses the light interruption and cause the coil current driver 22 to reverse the current in the coil 20. The current reversal in coil 20 causes a reversal in the magnetic field of the coil and produces a force driving the arm 12 in the opposite direction towards mechanical stop 32. As the end 18 of arm 12 (or shutter 42) interrupts the light beam between D2 and PD2, current sensing circuitry connected to PD2 (as shown in FIG. 8) senses the light interruption and causes the coil current driver 22 to reverse the current in coil 20. As detailed below this process may be repeated numerous times (until a good reading of the bar code has taken place or other preset system requirements have been met).

Figure 7:
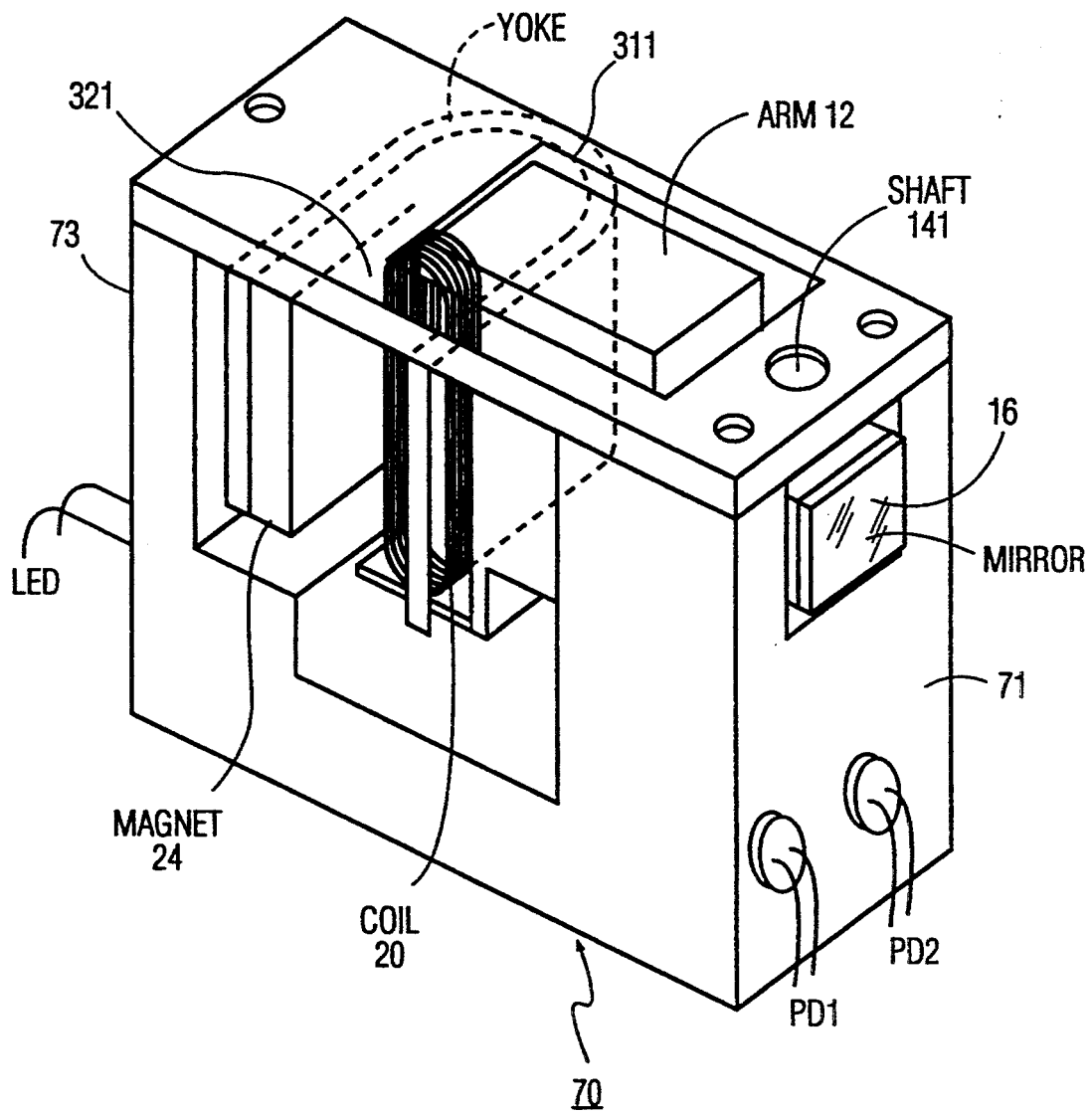
FIG. 7 is an isometric view of a package assembly embodying the invention.

The arm 12, coil 20 and permanent magnet 24 may be assembled as shown in FIG. 7. Referring to FIG. 7 there is shown a generally rectangular box 70 in which is housed a mirror assembly embodying the invention. A shaft 141 passing through the shaft hole 14 (not shown) of the arm 12 holds the arm in place such that it will not move forwardly or rearwardly while being free to rotate laterally, from side to side. The shaft also functions to hold arm 12 suspended above the bottom of the package.

The face 16 of the mirror extends exteriorly of the front side 71 of the package, whereby a laser or other light beam can be directed onto its surface and be reflected therefrom. A coil 20 is mounted within the inverse C-shaped pocket at the other end (18) of the arm 12. The coil is attached (bonded) to the arm using glue or any other adhesive or bonding agent. A suitable means to hold the coil securely in place may be used. A U-shaped yoke to which is mounted permanent magnet 24 is fixedly connected to the rear end of the box 70 with one leg of the U of the yoke magnet passing through the center of the coil 20.

In FIG. 7 a U-shaped yoke magnet combination is used. But, it should be evident that any other suitably shaped magnet may be used instead as long as it provides the required magnetic field.

In FIG. 7 there is only one LED mounted on the rear end 73 of package 70 for use with two photodiodes (PD1,PD2) which are mounted on the front end 71 of package 70. The shutters 41 and 42 shown in FIG. 6, but not seen in FIG. 7, are located on the underside of the arm 12. As the arm rotates back and forth laterally, the light beam from the LED is interrupted from shining on PD1 and then on PD2 as discussed above. Note that the function of the mechanical stops 31 and 32 identified in FIG. 6 is achieved in FIG. 7 by arranging for the arm 12 to come into contact with areas of the inside walls denoted as 311 and 321 of package 70 in FIG. 7.

Figure 8A:
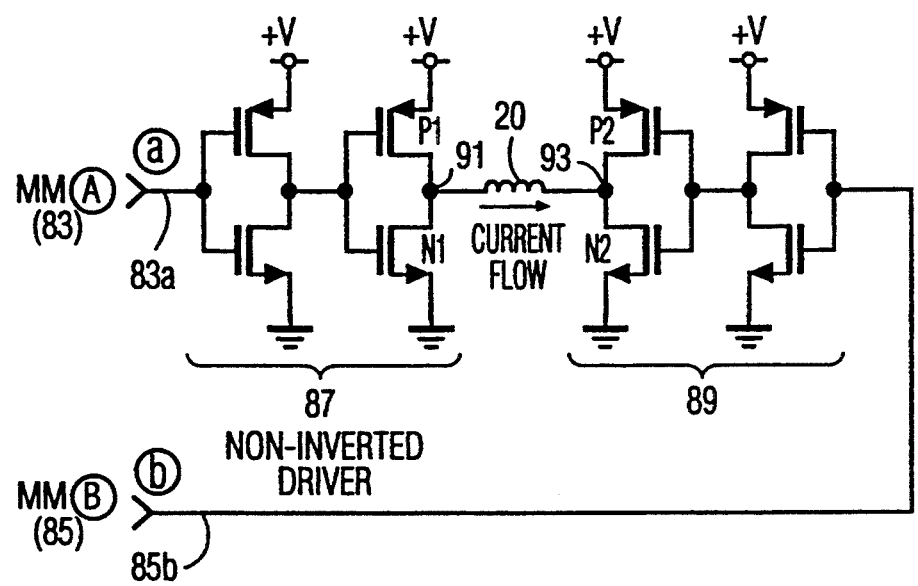
FIG. 8A is a schematic diagram of driver circuit of FIG. 8 driving the coil of FIG. 8.

FIG. 8 shows the basic electrical blocks needed to drive the coil 20 to cause the mirror to vibrate in a desired manner. FIG. 8 includes an oscillator 81 whose output is applied to a first monostable multivibrator (MM) 83 and a second monostable multivibrator (MM) 85. The output of MM83 is connected to the input of a driver amplifier 87 (also denoted as Driver "A") and the output of MM85 is connected to the input of a driver amplifier 89 (also denoted as Driver "B"). The output of amplifier 87 is connected to one end 91 of coil 20 and the output of amplifier 89 is connected to the other end 93 of coil 20. The output stage of amplifiers 87 and 89 may be complementary driver outputs employing complementary insulated-gate field-effect transistors (IGFET's) as shown in FIG. 8A. Each one of amplifiers 87 and 89 is comprised of two inverters connected in cascade. The first inverter of amplifier 87 drives the input of the second inverter of amplifier 87 comprised of IGFETS P1 and N1. The first inverter of amplifier 89 drives the input of the second inverter of amplifier 89 comprised of IGFETS P2 and N2.

Figure 8B:
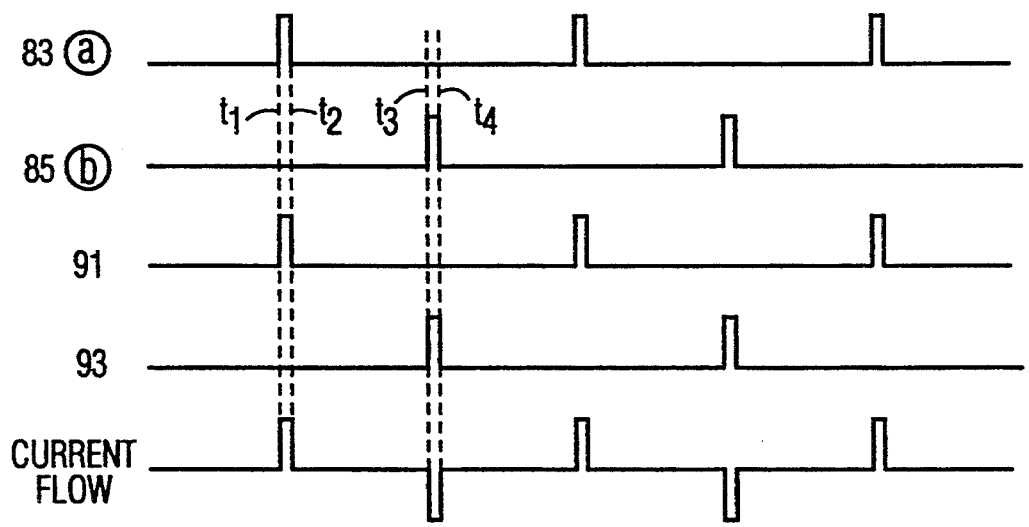
FIG. 8B is a waveform diagram of signals associated with the circuit of FIG. 8.

The operation of the amplifiers 87,89, in accordance with the invention, is such that when a high signal (e.g., +V volts) is applied from 83a of MM83 to the input of amplifier 87, a low signal (e.g., 0 volts) is applied from MM85 to the input 85b of amplifier 89 a low signal is applied from the of MM85 to the input of 85b amplifier 89, as shown for time t1-t2 in FIG. 8B. Likewise when a high signal is applied from MM85 to the input 85b of amplifier 89 a low signal is applied to the input (83A) of inverter 87, as shown for time t3-t4 in FIG. 8B. Thus, when there is a positive pulse at 83A and low at 85B, the transistor P1 is on and conducting (N1 is off) and applies +V volts to terminal 91 of coil 20. At the same time transistor N2 is on and conducting (P2 is off) providing a low impedance connection between terminal 93 of coil 20 and ground. Consequently, conventional current flows through the coil from terminal 91 to terminal 93 as indicated in FIG 8A and as represented in FIG. 8B by a positive going pulse. Similarly, when there is a positive pulse at 85B and a low at 83A, the transistor P2 is on N2 is off and conducting and applies +V volts to terminal 93 of coil 20.

At the same time, transistor N1 is on P1 is off and conducting providing a low impedance connection between terminal 91 of coil 20 and ground. Consequently, conventional current flows through the coil from terminal 93 towards terminal 91 in the opposite direction to that indicated in FIG 8A and is represented in FIG. 8B by a negative going pulse for time t3-t4. As further discussed below, in circuits embodying the invention short duration pulses are employed in the system, which tend to turn the transistors either fully-on or fully-off which tends to minimize the power dissipation.

Referring back to FIG. 8 there is shown an LED, D1, providing a light signal to PD1 and PD2 with a shutter (41,42) which can move to interrupt or block the light path between the LED and PD1 or PD2. The photo current through PD1 flows through R2 to produce a voltage V1 at node 95. The photo current through PD2 flows through R3 to ground to produce a voltage V2 at node 97. The voltage V1 at node 95 is applied to a first comparator 101 (also denoted at comparator A) and the voltage V2 at node 97 is applied to a second comparator 103 (also denoted as comparator B). A reference voltage (VREF) is applied to one input of each one of comparators 101 and 103. The output of comparator 101 is applied to a delay network 105 (also denoted as Delay A) and the output of comparator 103 is applied to a delay network 107 (also denoted as Delay B). The outputs of delay networks 105 and 107 are applied to an oscillator 81.

The operation of the system of FIG. 8 will be explained with reference to the waveform diagrams of FIG. 9. Oscillator 81 may be any one of a number of oscillators capable of producing a square or rectangular signal of the type shown in waveform 1 of FIG. 9.

Note that the free running oscillator frequency is preferably less than one half the desired number of scans for which the system is designed. For example, if it is desirable to have 50 scans per second (i.e. the mirror is to vibrate at a rate of 50 scans/second) the oscillator frequency would typically be selected at 15 to 20 HZ.

Assume that the oscillator 81 is triggered on and that a positive going pulse is applied to MM83 which is designed to respond to input signals making a low-to-high transition. MM83 then produces a pulse which is applied to amplifier driver 87 whose output is a pulse of like amplitude and duration as shown in waveform 2 of FIG. 9. Note that when a positive going pulse is applied to node 91 (which for purpose of example may be assumed to be +V volts) the voltage at node 93 is at or close to ground potential. Conventional current then flows through the coil 20 from node 91 to node 93 and induces a magnetic field which causes the arm to move in one direction. Referring to FIG. 7 assume that the back end of the arm 12 moves to the right, up towards mechanical stop area 311. At some point shutter 41 interrupts the light beam to PD1. When that occurs the voltage V1 at node 95 drops below the reference voltage (VREF) causing the output of comparator 101 to produce a positive going pulse as shown in waveform 4 of FIG. 9. The pulse produced at the output of comparator 101 is applied to delay network 105. One purpose of the delay network 105 (and also network 107) is to permit the arm to strike the mechanical stop 311 (inside wall of chamber) and to start bouncing back before applying a current pulse to the coil. Enabling this elastic return in a desired direction saves power.

After a delay, TP1, a pulse is produced at the output of delay network 105 which is applied to oscillator 81 and causes the output of oscillator 81 to change state.

For purpose of this example, assume that the output of oscillator 81 goes from high to low. The high-to-low transition at the output of oscillator 81 is sensed by MM85 which produces a positive going pulse applied to driver 89 which then applies a positive going pulse to terminal 93 of coil 20 as shown in waveform 3 of FIG. 9. For this assumed condition conventional current now flows through the coil from terminal 93 to terminal 91 and via driver 87 to ground. This condition of current is in the opposite direction to the previous current pulse in the coil. The magnetic field is now of opposite direction to that previously induced and the arm is propelled in a direction, to the left or down, referring to FIG. 7.

When the arm moves such that shutter 42 or the back end of arm 12 interrupts the light beam incident on PD2, the voltage at node 97 drops below the reference voltage (VREF) applied to comparator 103. As a result, a positive pulse is produced at the output of comparator 103 as shown in waveform 6 of FIG. 9. The pulse shown in waveform 6 is applied to delay network 107 which produces a pulse as shown in waveform 7 of FIG. 9 after a delay, Tp2, which is applied to oscillator 81. As before, the delay Tp2 allows the arm to strike mechanical stop 321 and to start bouncing back before a pulse is applied to coil 20. The delayed pulse shown in waveform 7 from delay network 107 causes the oscillator output to make a transition (i.e. to go high-to-low) exciting MM83 and beginning anew the process described above.

Figure 9:
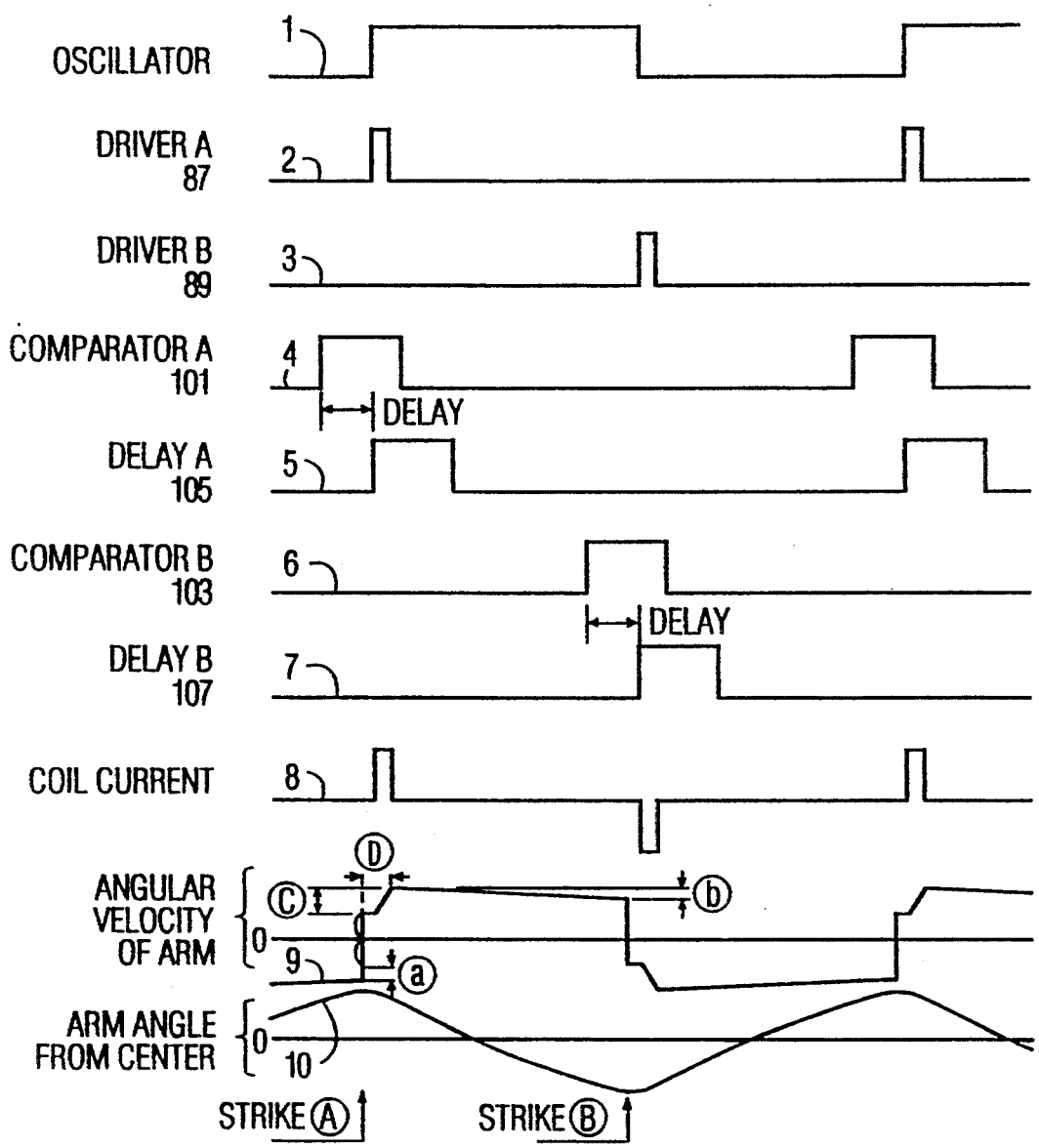
FIG. 9 is a diagram of waveforms associated with the diagram of FIG. 8.

As is evident from the operation of the system illustrated in FIGS. 8 and 9, a significant aspect of the invention is that the vibration of the mirror is achieved and maintained by the application of pulses to the coil. These pulses have a very short pulse width (i.e., they have a small duty cycle). For example, in one embodiment vibration of the arm/mirror in the combination, shown in FIG. 7 was obtained using a 3 volt power supply and drawing 90 milliamperes with a five percent (5%) duty cycle. The resulting power dissipation is in the order of 13.5 milliwatts which represents a significant improvement over the prior art. The use of short duration pulses contributes to the low power dissipation and power consumption of the system since the circuitry will normally be either fully turned-on or fully turned-off.

It is evident that in systems embodying the invention, the arm/mirror combination is the only moving part. This ensures the system to have a high degree of reliability and very little wear with time. By making the arm/mirror combination very light and mounting the combination on a smooth shaft (spindle), it is evident that very little power will be dissipated to overcome very small frictional losses.

Since the energy loss when striking either mechanical stop is small, the energy needed to replace or restore the energy loss is also very small. Of course, as noted above, the arm and mechanical stops are designed to have a high degree of elasticity. Thus, in systems embodying the invention, energy is supplied to the system (i.e., the coil driver is turned on) for a short period of time after the arm has struck a mechanical stop and has bounced back (or is bouncing back). This ensures iso-angular velocity as further discussed below.

It should be appreciated that, as shown graphically in waveform 9, of FIG 9, when the arm strikes a stop, there is some energy loss. This is represented by segment "a" in waveform 9 of FIG. 9. Waveform 9 also shows the effect of the energy supplied to the system during each interval "D". After the energy pulse supplied from time t1 to t2 during the time interval "D", there is no further energy pulse supplied to the system until time t4 to t5 as shown in waveform 8 of FIG. 9. Since no energy is supplied to the system during the period "e" (between time t2 and t3) the angular velocity of the system decreases (slightly) with time due to friction in the arm bearing the air friction. This is represented by the droop "b" in waveform 9. Waveform 9 also shows that during each interval "D" there is energy supplied to the system by the coil current pulses shown in waveform 8. The energy supplied to the systems is represented by segment "c" in waveform 9. The duration of interval D begins when the angular velocity changes abruptly as the arm strikes a stop (31,32 in FIG. 6 or 311,321 in FIG. 7. The duration of interval D may be shortened by detecting more accurately or precisely the point in time at which the arm hits a stop and then supplying the energy to the coil. The energy loss due to friction in the "arm bearing" and air friction may be reduced by careful design of the system and package. Minimizing the energy losses reduces the amount of energy which need be supplied to the system and results in the arm being driven almost perfectly in iso-angular velocity.

The angular response of the arm from the center position as the arm oscillates back and forth is shown in waveform 10 of FIG. 9. It is evident from the waveform that a high degree of linearity is exhibited. Thus, another significant aspect of the invention is that iso-angular velocity is obtained. This results in very near ideal operation of the system.

It should be appreciated that when the arm going in a first direction strikes a mechanical stop and bounces back, some energy is lost due to air friction and the bearing/shaft on which the arm is mounted. This loss in energy is replaced by the pulse of current applied to the coil by the coil driver which also causes the arm to go in the opposite direction to the first direction until the arm strikes the second mechanical stop. Since the energy loss when striking either mechanical stop is small, the energy needed to replace or restore the energy loss is also very small. Of course, as noted above, the arm and mechanical stops are designed to have a high degree of elasticity.

Note that in systems embodying the invention, energy is supplied to the system (i.e., the coil driver is turned on) for a short period of time after the arm has struck a mechanical stop and has bounced back (or is bouncing back). This ensures that iso-angular velocity is obtained as the arm vibrates back and forth.

Another feature of the invention is that since the mirror vibrates, the light beam is swept across the bar code first in one direction and then in the opposite direction. This permits bi-directional reading of the bar code information. Comparing and analyzing the two readings enables verification of the information in a novel manner.

Figure 10:
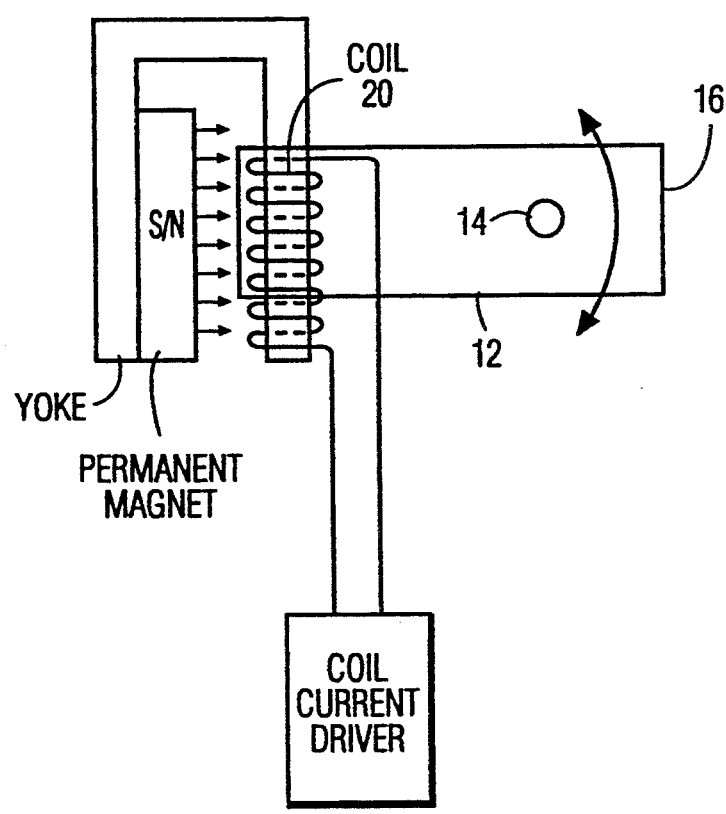
FIG. 10 is an idealized representation of another electromagnet arrangement embodying the invention.

FIG. 10 illustrates the yoke coupling the permanent magnet and the coil and is a more detailed and accurate representation of the arm, coil and magnet combination than that shown in FIG. 4.

Figure 11:
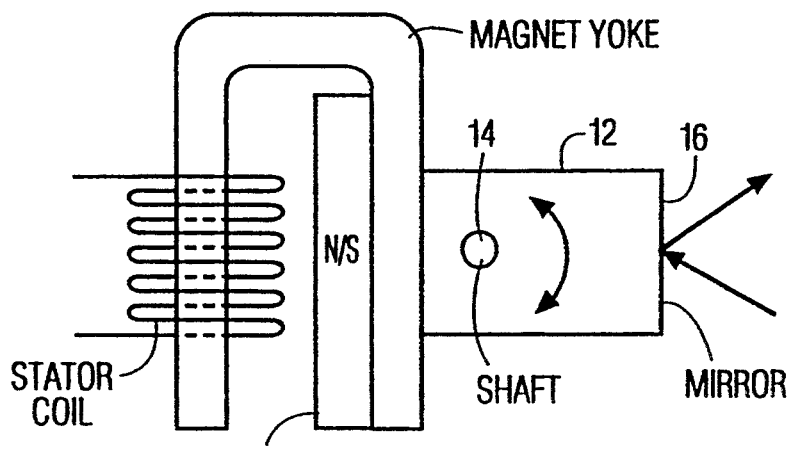
FIG. 11 is an idealized representation of still another electromagnetic arrangement embodying the invention.

In FIGS. 4,5,6,7 and 10, the coil is shown mounted on the arm. However, as shown in FIG. 11, the coil may be fixedly positioned with the magnet, yoke and arm vibrating about pivotal point 14. Referring to FIG. 11 note the stator coil 211 which would be in a fixed position has one leg of the yoke going through it while the other leg of the yoke is attached to permanent magnet 241 and arm 12. This type of structure provides some simplification. However, the drawback is that the magnet/yoke would now be heavier due to the weight of the arm and would tend to reduce the power efficiency. However, with careful design FIG. 11 represents a viable alternative to the systems shown in the previous FIGURES.

Figure 12A:
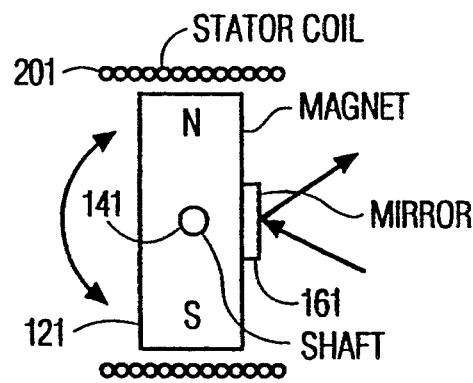
FIG. 12A is a symbolic representation of the stator coil being apart from a magnetized mirror/arm combination.
Figure 12B:
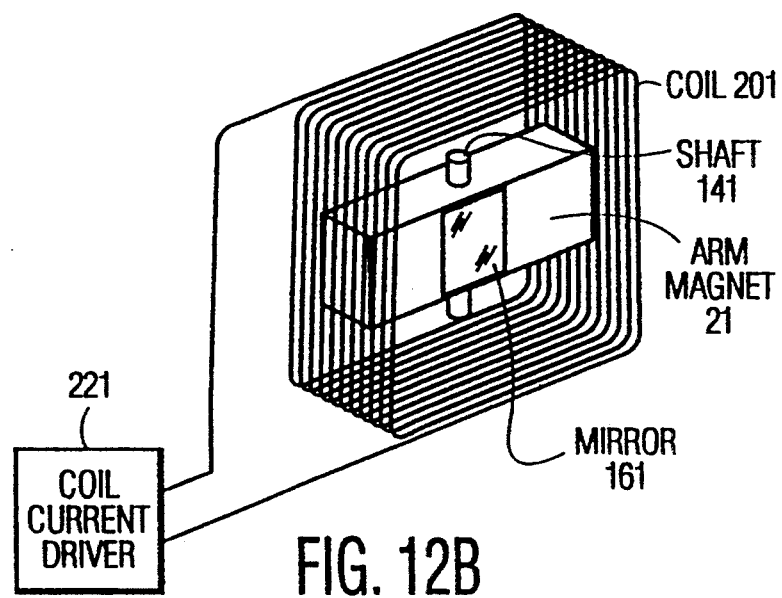
FIG. 12B is an isometric representation of the FIG. 12A system.

Another arrangement where the coil producing a varying magnetic field is non-moving and located apart from the arm while still controlling the vibration of the arm is shown in FIGS. 12A and 12B.

Referring to FIGS. 12A and 12B, note that the mirror 161 is placed on the arm 12 which would be magnetized. A coil 201 is positioned around the magnetized arm/mirror combination and is driven by a coil current driver 221. The driver 221 supplies bi-directional current to the coil to cause reversal of the magnetic and the arm to vibrate.

In FIGS. 4 through 12 the invention has been illustrated using various arrangements employing coils, magnets and yokes and electromagnets to provide sufficient energy to the arm to cause it to vibrate. However, there other means may be used to supply energy to the arm bearing the mirror to cause it to vibrate.

Figure 14:
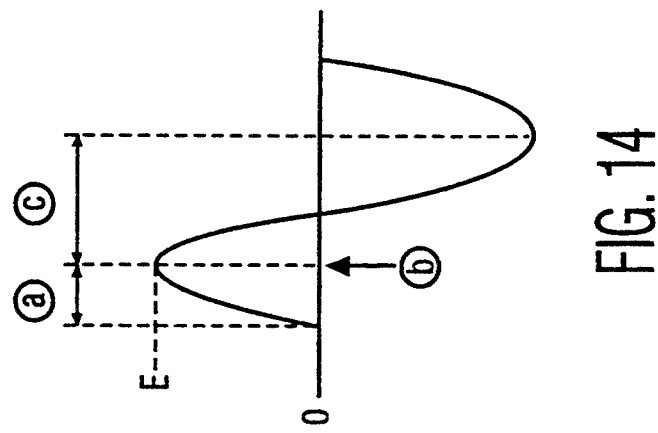
FIG. 14 is a diagram of the electrical signal produced by the system of FIG. 13.
Figure 13:
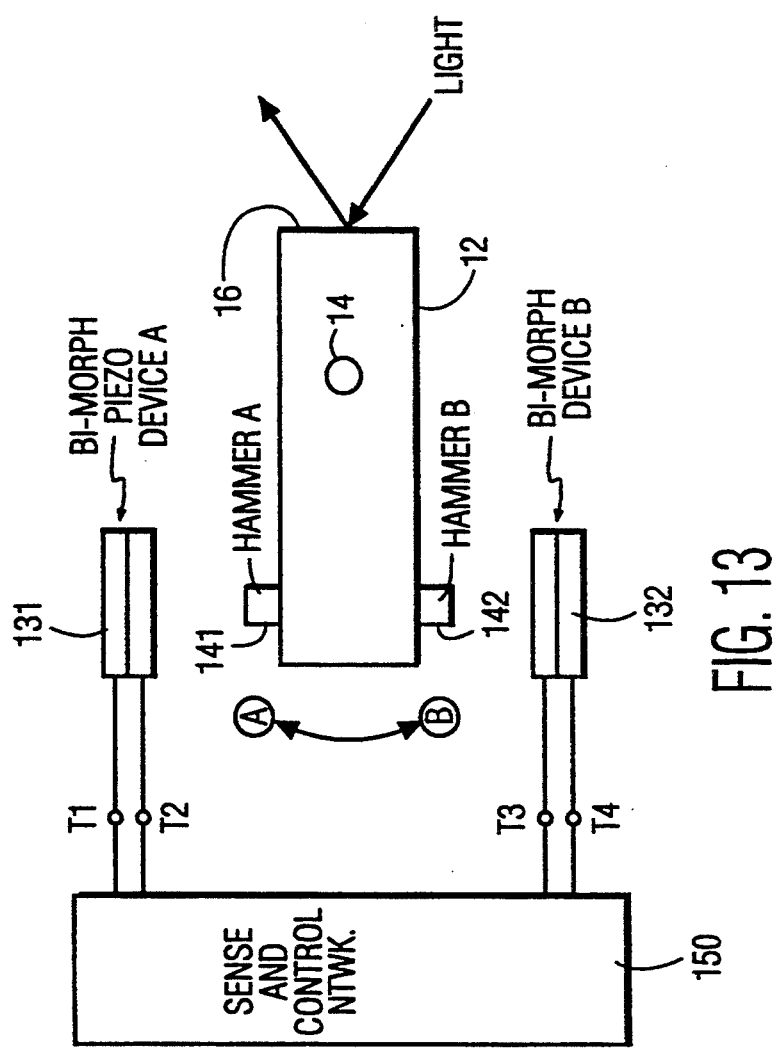
FIG. 13 is an idealized representation of an arrangement embodying the invention and including bi-morph devices.

Referring to FIG. 13, there is shown an arm 12 with a shaft 14 on which the arm is mounted so it can rotate back and forth as shown by the two headed arrow. FIG. 13 shows two bimorph devices 131 and 132 (also denoted as A & B respectively) which are fixedly mounted in a housing. The bimorph devices are piezo electric elements which produce an electrical signal proportional to the mechanical stress they undergo. When the arm rotates to the A side and the hammer 141 extending from the side of the arm 12 strikes the bimorph device 131, the device 131 is deformed and produces an electrical signal between terminals T1 and T2, thereof having the characteristics shown in segment a of FIG. 14. The maximum signal generated will be of amplitude E which occurs at b at which point the arm is going to be pushed back away from bimorph 131 towards the B side and towards bimorph 132. A sense and control network 150 can sense the occurrence of E at b and apply a signal to the bimorph 131 which will deform it in the opposite direction to the direction of impact thereby repulsing arm 12 and propelling the arm in the opposite direction. As the arm 12 sweeps into side B it impacts bimorph 132, and the process of sensing and deforming described above is repeated.

What is claimed is:

1. An information reader comprising:
   an arm of given length "L", having a polished mirror-like surface at one end of the arm located in a plane generally perpendicular to the direction of the length of the arm; said mirror-like surface being reflecting a beam of light incident on its surface whereby when the mirror-like surface is rotated, a beam of light incident on the surface is reflected from the mirror-like surface through an angle proportional to the degree of rotation onto the information to be read;
   means for mounting the arm to enable the arm to rotate freely in a lateral direction perpendicular to the length of the arm while preventing frontward and backward motion in a direction along the length of the arm; and
   controllable electro magnetic means coupled to said arm including a coil and means for supplying a bi-directional current to said coil for causing the arm to vibrate back and forth in the lateral direction.

2. The information reader of claim 1 wherein the mirror is at said one end of the arm and the coil is at the other end of said arm.

3. The information reader of claim 2 wherein said magnetic means includes a U-shaped magnetic means, and wherein one leg of said U-shaped magnetic means is positioned within the center of said coil.

4. The information reader of claim 3 wherein said other end of said arm includes an inverted C-shaped pocket and wherein said coil is positioned within said C-shaped pocket.

5. The information reader of claim I wherein there is further included a first mechanical stop to block the travel of the arm beyond a certain point in a first direction and a second mechanical stop to block the travel of the arm beyond a certain point in a second direction, said arm and said first and second mechanical stops being designed such that when the arm strikes a mechanical stop it bounces readily away from the stop.

6. The information reader of claim 5 wherein there is further provided position sensing means for sensing when the arm is in close proximity to said first mechanical stop and when the arm is in close proximity to said second mechanical stop; and further including means coupled between said position sensing means and said coil for causing the current in the coil to flow in one direction when the arm is in close proximity to said first mechanical stop and for causing the current in the coil to flow in the opposite direction, to said one direction, when the arm is in close proximity to said second mechanical stop.

7. The information reader of claim 6 wherein said position sensing means includes a light emitting diode (LED) means and first and second photo diodes, said first photo diode for sensing when the arm is in proximity to said first mechanical stop and said second photo-diode for sensing when the arm is in proximity to said second mechanical stop.

8. The information reader of claim 7 wherein said arm includes shutter means for blocking the light path between the LED means and the first photo diode when the arm is in proximity to the first mechanical stop and for blocking the light path between the LED means and the second photo diode when the arm is in proximity to the second mechanical stop.

9. The information reader of claim 5 wherein there is further provided a first position sensing means for sensing when the arm is in close proximity to said first mechanical stop and a second position sensing means for sensing when the arm is in close proximity to said second mechanical stop; and further including means coupled between said first and second position sensing means and said coil for causing the current in the coil to flow in one direction when the arm is in close proximity to said first mechanical stop and for causing the current in the coil to flow in the opposite direction, to said one direction, when the arm is in close proximity to said second mechanical stop.

10. The information reader of claim 1 wherein "L" is less than one inch.

11. The information reader of claim 1 wherein said arm, said magnetic means and said coil are mounted in a package whose volume is less than nine (9) cubic inches.

12. The information reader as claimed in claim 3 wherein said U-shaped magnet is a permanent magnet which is stationary and wherein said coil is mounted on said arm and wherein said arm and coil combination moves relative to said stationary permanent magnet.

13. A bar code reader comprising:
   an arm of given length "L";
   a reflective mirror-like surface located at one end of the arm in a plane generally perpendicular to the direction of the length of the arm; said mirror-like surface reflecting a beam of light incident on its surface whereby when the mirror-like surface is rotated by X degrees the beam of light reflected from the mirror-like surface sweeps through an angle proportional thereto;

means for mounting the arm to enable the arm to rotate freely in a lateral direction perpendicular to the length of the arm while preventing frontward and backward motion in a direction along the length of the arm; and magnetic means coupled to the other end of said arm including a coil and means for supplying a bi-directional current to said coil for causing the arm to vibrate back and forth in the lateral direction.

14. The information reader as claimed in claim 5 wherein said first mechanical stop includes a first bimorph and wherein said second mechanical stop includes a second bimorph.

15. The information reader as claimed in 14 wherein each one of said first and second bimorphs when struck by said arm produces an electrical signal.

16. A bar code reader comprising:

an arm of given length "L", having a polished mirror-like surface located on a surface of the arm located in a plane generally perpendicular to the direction of the length of the arm; said mirror-like surface reflecting a beam of light incident on its surface whereby when the mirror-like surface is rotated, a beam of light incident on the surface is reflected from the mirror-like surface through an angle proportional to the degree of rotation;

means for mounting the arm including a shaft on which to mount the arm to enable the arm to rotate freely in a lateral direction perpendicular to the length of the arm while preventing motion in a direction along the length of the arm; and controllable means including a reversible source of energy coupled to the arm for causing the arm for causing the arm to vibrate back and forth in the lateral direction.

17. The bar code reader of claim 16 wherein said controllable means is an electromagnetic means and wherein said reversible source of energy includes means for supplying bi-directional current to said electromagnetic means.

18. The bar code reader of claim 17 wherein said polished mirror-like surface is located at one end of the arm and said electromagnetic means is located at the other end of said arm.

19. The bar code reader of claim 17 wherein said electromagnetic means includes a U-shaped magnetic means and a coil; and wherein one leg of said U-shaped magnetic means is positioned within the center of said coil.

20. The bar code reader of claim 16 wherein said polished mirror-like surface is located at one end of the arm and wherein said arm has another end which includes an inverted C-shaped pocket and wherein a coil is positioned within said C-shaped pocket.

21. The coil as claimed in claim 16 wherein said arm is magnetized, and wherein said controllable means includes a coil and means for supplying bi-directional current to said coil and wherein said coil produces a reversible magnetic field encompassing said arm for causing said arm to rotate.

* * * * *